United States Patent [19]
Hoyss et al.
[11] 4,365,418
[45] Dec. 28, 1982

[54] DRILL STAND WITH MARKING ELEMENT

[75] Inventors: Franz Hoyss, Bad-Tölz-Oberf.; Franz Popp, Pucheim, both of Fed. Rep. of Germany

[73] Assignee: Hilti Aktiengesellschaft, Schaan, Liechtenstein

[21] Appl. No.: 215,912

[22] Filed: Dec. 12, 1980

[30] Foreign Application Priority Data

Dec. 17, 1979 [DE] Fed. Rep. of Germany ....... 2950816

[51] Int. Cl.[3] ....................... B27G 23/00; B23B 39/00
[52] U.S. Cl. .................................... 33/185 R; 33/189; 408/75
[58] Field of Search ............... 33/185 R, 189; 408/75, 408/86, 115 B, 116, 184, 214 G, 241 S

[56] References Cited

U.S. PATENT DOCUMENTS

| | | | |
|---|---|---|---|
| 793,901 | 7/1905 | Noyes | 408/75 |
| 893,427 | 7/1908 | Bennett | 33/185 R |
| 1,166,261 | 12/1915 | Rogers | 33/189 |
| 2,369,425 | 2/1945 | Becker | 33/185 R |
| 2,373,927 | 4/1945 | Turner | 33/189 |
| 2,568,886 | 9/1951 | Fried | 408/75 |
| 2,601,330 | 6/1952 | Schmidt | 33/189 |
| 3,915,241 | 10/1975 | Bieri | 173/32 |

*Primary Examiner*—Richard R. Stearns
*Attorney, Agent, or Firm*—Toren, McGeady & Stanger

[57] ABSTRACT

On a drill stand, a drilling member is movable between an inactive position spaced from the material to be drilled and an active position in contact with the material to be drilled. A marking element is mounted on the stand and is slidably movable between a retracted position and a marking position. In the marking position, a pointer on the element can mark the drilling axis on the material to be drilled. With the drilling axis located, the drilling member can be moved into the active position to commence drilling.

2 Claims, 6 Drawing Figures

DRILL STAND WITH MARKING ELEMENT

SUMMARY OF THE INVENTION

The present invention is directed to a drill stand and, more particularly, to a marking element movably mounted in a drill stand.

A drill stand provides a support for a drilling machine so that the machine can be moved between an inactive position and an active position. Usually a drilling machine, because of its heavy weight and bulky structure, can be located in a drilling position only with great difficulty. Diamond drills, that is a stand with a drilling machine carrying a boring tool studded with diamonds, often weigh 40 kgms. or more.

To date, the working sequence with diamond drills has been as follows. Initially, the location on the surface of the material to be drilled is located and marked with center lines. Next the diamond drill is moved over the general location of the drilling area and subsequently the drilling tool is moved toward the surface of the material to be drilled from a position spaced from the surface. Before commencing drilling, the drilling tool should be aligned as accurately as possible with the center of the area to be drilled, that is, the location identified by the center lines. Effecting the proper location of the drilling tool is achieved only in rare cases, since the alignment of the drilling axis with the center lines on the surface to be drilled can only be located approximately because the alignment of the drilling tool axis can only be estimated relative to the center of the surface to be drilled. It is only after the drilling tool is brought down into contact with the surface to be drilled that it is possible to determine if correct alignment has been achieved.

Another problem faced in aligning the drilling tool is that the tool is usually a large hollow cylindrical member and covers not only the center lines at the location to be drilled but also the surrounding area so that correct alignment cannot be accurately determined. Accordingly, providing the proper location of a diamond drill usually involves a trial and error procedure with the drilling tool being moved back and forth until exact alignment has been obtained.

Consequently, locating a diamond drilling tool in the working position has the considerable disadvantages of high time consumption and difficult handling of the device while effecting the positioning of the drilling tool.

Therefore, it is the primary object of the present invention to provide a marking device on a drill stand which permits simple and accurate alignment of the drilling tool over the surface to be drilled.

In accordance with the present invention, a marking element is incorporated into the drill stand for locating the drilling axis in alignment with the center on the surface to be drilled.

A marking element, preferably forming a part of the drill stand, permits exact alignment of the drilling axis over the center of the area to be drilled, first, by moving the drill stand in the general area to be drilled and then using the center or pointer of the marking element aligning the drilling axis with the center of the surface to be drilled. When the drilling tool is moved against the surface to be drilled, the drilling axis is aligned precisely with the center located on the surface. Therefore, it is no longer necessary to search for the correct operating position of the drill stand by moving the stand a number of times.

The marking element can be constructed as a ring, formed on the drill stand, with the drilling tool being positionable within the ring. The topside of the ring has center line coordinates which can be brought into alignment with the center lines on the surface to be drilled.

In a preferred embodiment, the marking element can be incorporated into the drill stand and be displaceable between a retracted position and a marking position. A suitable marking member would again be a ring, provided with center lines or cross hairs as well as a pointer for indicating the position of the drilling axis directly aligned above the center of the area to be drilled. If a pointer-like marker is used, it is sufficient to indicate the drilling location by a point marking its center.

It is advantageous if the marking element includes stops defining the retracted position and the marking position. With such a stop arrangement handling of the marking element is simplified. Accordingly, the marking element can be moved between a pair of stops so that against one stop it is in the marking position and against the other stop it is in the retracted position without paying any special attention to the general path of movement. To guarantee that the marking element remains in the desired operating position during use of the drill stand, holding means are provided for securing the marking element in the retracted position and/or the marking position. A catch or clamping element, per se, would be suitable for holding the marking element in position.

A simple holding means for the marking position can be provided by a spring which drives the marking element into the marking position. Further, the spring secures the marking element against the above-mentioned stop. The spring has another advantage in that, when it is released by a push button, the marking element moves automatically into the marking position.

By locating it in the base of the drill stand, the marking element can be moved as closely as possible to the surface of the material to be drilled with a minimum structural expenditure. This arrangement is especially effective where the marking element is slidably movable between its two end positions.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figures 1, 5, 6:
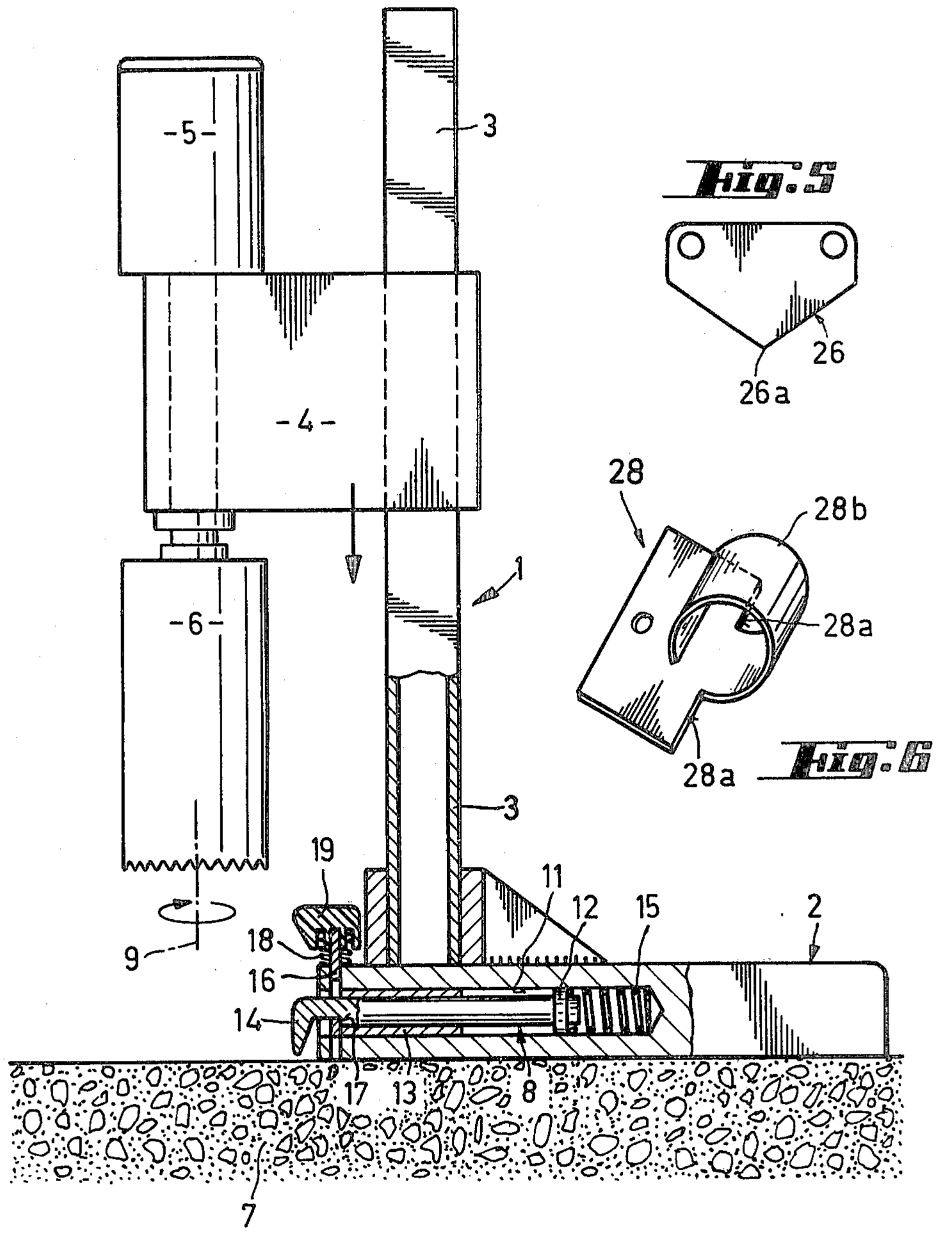
FIG. 1 is a side elevational view, partly in section, of a drill stand with a pointer-shaped marking element located in the retracted position.
FIG. 5 is a detail view of the marking element set forth in FIGS. 3 and 4.
FIG. 6 is a perspective view of a stop spring as used in the embodiment of FIGS. 3 and 4.

In FIG. 1 a drill stand 1 is shown including a base 2 supported on the material 7 which is to be drilled with a guide column 3 extending vertically upwardly from the stand. A carriage 4 is slidably mounted on the guide column and supports a drilling machine 5 which drives a drilling tool 6. While the stand is supported on the material 7 which is to be drilled, the drilling tool 6 is spaced upwardly from the surface of the material and is held in the inactive position.

A marking element in the form of a pointer 8 is slidably mounted in the base 2 of the drill stand and extends perpendicularly to the drilling axis 9 of the drilling machine 5 and drilling tool 6. A blind receiving bore 11 is located in the base 2 and a flange 12 is formed on the pointer 8 and extends outwardly into surface contact with the bore so that the inner end of the pointer is in sliding contact with the surface of the bore. The shaft-shaped main section of the pointer 8 extends from the flange 12 through a bushing 13 located in the front end of the bore 11. The pointer 8 slides in the bushing 13. At its end projecting outwardly from the bore 11, the pointer has a bent head 14 which extends downwardly. A spring 15 is located in the rear portion of the bore and acts on the rear end of the pointer 8 biasing it in the direction toward the drilling axis 9.

In FIG. 1, the pointer 8 is in the retracted position and, in spite of the biasing action of the spring 15, it is retained in this position by a slide 16 mounted in the stand. The pointer 8 has a shoulder 17, note FIG. 2, arranged to interengage with the slide 16 and hold the pointer in the retracted position. A compression spring 18 biases the slide 16 in a position for maintaining the retracted position of the pointer 8. The spring extends between the top of the base 2 and an actuating button 19 attached to the side. This upward pressing action of the spring 18 against the button 19 maintains the slide 16 in contact with the shoulder 17.

Figure 2:
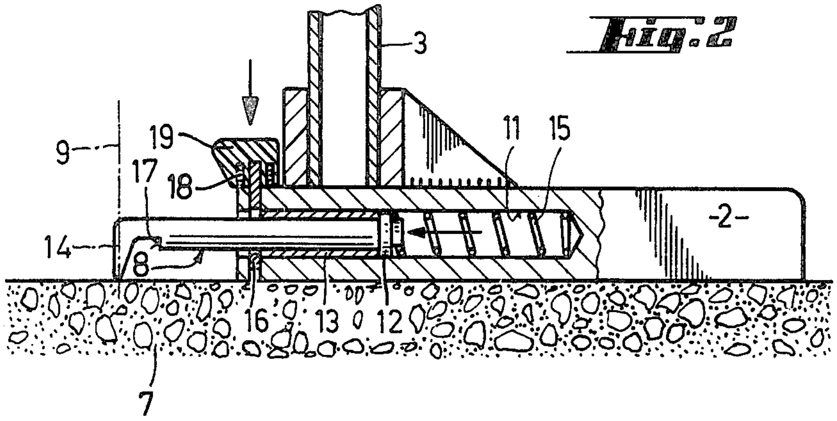
FIG. 2 is a view similar to FIG. 1, however, only showing the base of the drill stand with the marking element in the marking position.

When the actuating button is pressed downwardly, the shoulder 17 is released by the slide 16 and the pointer 8 is displaced out of the bore 11 by the spring 15 into the marking position. As is shown in FIG. 2, with the pointer 8 in the marking position the drilling axis 9 passes through the head 14.

The marking position is also defined by a stop afforded by the inner end of the bushing 13 which contacts the annular flange 12 when the pointer 8 is displaced by the spring 15 into the marked position.

In using this apparatus, initially the area to be drilled in the material 7 is identified by a marking point or center lines. Next, the drill stand is moved over the area to be drilled and for easy mobility the drill stand can be provided with wheels. The pointer 8 is placed in the marking position so that its head 14 coincides with the center line of the drilling member. After the head is aligned above the marking point on the surface to be drilled, the pointer is pushed into the bore 11 against the force of the spring 15 and it is locked automatically in the retracted position by the engagement of the slide 16 with the shoulder 17. The compression spring 18 biases the slide 16 into holding engagement with the shoulder 17. The drilling tool 6 is moved into contact with the surface of the material 7 to be drilled by moving the carriage 4 downwardly along the guide element 3 and it is ensured that the drilling axis 9 is aligned above the marking point on the area to be drilled and, consequently, the bore formed by the drilling tool coincides exactly with the identified area on the surface to be drilled.

Figure 3:
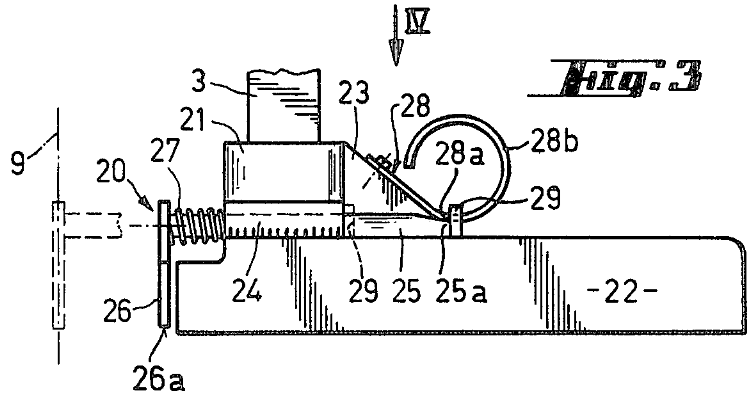
FIG. 3 is a side elevation view of the base of a drill stand showing another embodiment of a marking element located in the retracted position.

Another embodiment of the marking element 2 is shown in FIGS. 3–6. In FIG. 3 the guide column 3 as shown in FIGS. 1 and 2, supports a carriage mounting a drilling machine and a drilling tool, however, this apparatus is not shown for reasons of simplification. Guide column 3 is fixed in a socket 21 and the socket is welded to a base 22 of the stand having a different construction from the one shown in FIG. 1. To absorb the forces of reaction occurring during the drilling operation, guide column 3 and socket 21 are supported by a bracket 23 which is also welded to the base 22.

Figure 4:
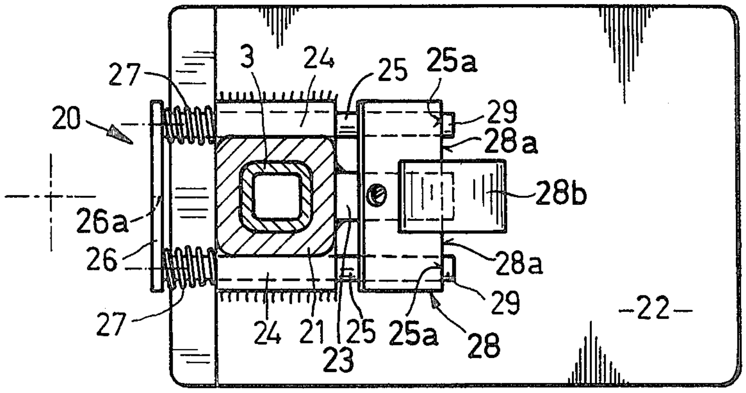
FIG. 4 is a plan view of the stand illustrated in FIG. 3 taken in the direction of the arrow IV.

As can be seen in FIG. 4, the socket 21 has side guide attachments 24 each of which serves to support a rod 25. Each rod 25 is movably mounted in its attachment 24. Each rod 25 has a forward end extending outwardly from the stand and a rearward end located inwardly of the stand. A marking disc 26 is secured to the front end of the rods 25 and the disc interconnects the rods. As can be seen in FIG. 5, the marking disc 26 is a flat plate member and it is shaped so that its lower edges converge into a point **26*a* intended to face toward the material being drilled. A spring 27 is located around each rod 25 extending between the marking disc 26 and the adjacent ends of the guide attachments 24. These springs 27 bias the marking element 20 into the marking position from the retracted position shown in full lines in FIG. 3. In the same figure the marking position is shown in phantom lines. The rods 27 are held in the retracted position against the force of the spring 27 by a stop spring 28 attached to the bracket 23 on the opposite side of the socket 21 from the marking disc 26. To effect the holding action on the rods 25, openings or recesses 25*a* are formed in the rods, note FIG. 3, and the sides 28*a* of the stop spring 28** resiliently engage in these openings.

The stop spring 28 is shown in perspective in FIG. 6. The sides **28*a* extend laterally outwardly from a strip section of the stop spring which is rolled to form a handle portion 28*b***.

By lifting the handle portion **28*b*, the sides 28*a* of the spring are lifted out of engagement with the openings or recesses 25*a* and the marking element is released so that it can be driven by the springs 27 into the marking position. To ensure that the rods move exactly into the marking position, the rear ends of the rods have radial projections 29, note FIG. 3. The sides 28*a* must be lifted upwardly beyond the projections 29 when the handle portion 28*b* is lifted. With the marking element 20 released, as the rods 25 move forwardly carrying the marking disc 26, the projections 29 serve as stops for the marking position by contacting the rearward ends of the guide attachments 24, note the phantom showing in FIG. 3**.

The embodiment of the marking element 20 operates in a manner basically analogous to the embodiment illustrated in FIGS. 1 and 2.

While specific embodiments of the invention have been shown and described in detail to illustrate the application of the inventive principles, it will be understood that the invention may be embodied otherwise without departing from such principles.

What is claimed is:

1. Drill stand comprising means for supporting a drilling member having a drilling axis for movement between an inactive position with the drilling member spaced from the material to be drilled and an active position with the drilling member moved into contact with the material to be drilled, and a marking element mounted on said means and being selectively displaceable between a retracted position and a marking position and in said marking position said marking element being located on the axis of the drilling member for locating the drilling axis on the material to be drilled, said means supporting a drilling member comprise a base arranged to be supported on the material to be drilled, said marking element being supported in said base, said base has a bore therein extending normally of the drilling axis, said marking element comprises a pointer slidably displaceable in said bore, a spring located in said bore inwardly of said pointer for biasing said pointer into the marking position, said pointer including a shaft-like portion having a shoulder adjacent one end thereof, and a slide member positioned in said base and spring biased into contact with said shoulder on said pointer for securing said pointer in the retracted position.

2. Drill stand comprising means for supporting a drilling member having a drilling axis for movement between an inactive position with the drilling member spaced from the material to be drilled and an active position with the drilling member moved into contact with the material to be drilled, and a marking element mounted on said means and being selectively displaceable between a retracted position and a marking position and in said marking position said marking element being located on the axis of the drilling member for locating the drilling axis on the material to be drilled, said means for supporting a drilling member comprise a base arranged to be supported on the material to be drilled, said marking element being supported in said base, a pair of laterally spaced guide attachments secured to said base and extending perpendicularly of the drilling axis, said marking element comprising a pair of rods each slidably displaceable in one of said guide attachments, a marking plate secured to and extending between said rods, springs positioned on said rods between said marking plate and said guide attachments for biasing said marking element to the marking position, and a stop spring mounted on said base and engageable with said rods for securing said marking element in the retracted position.

* * * * *